July 27, 1965
R. G. WATSON
3,197,137
APPARATUS FOR SENSING DISPLACEMENT OF
OR DISTANCE ALONG A SURFACE
Filed June 20, 1962
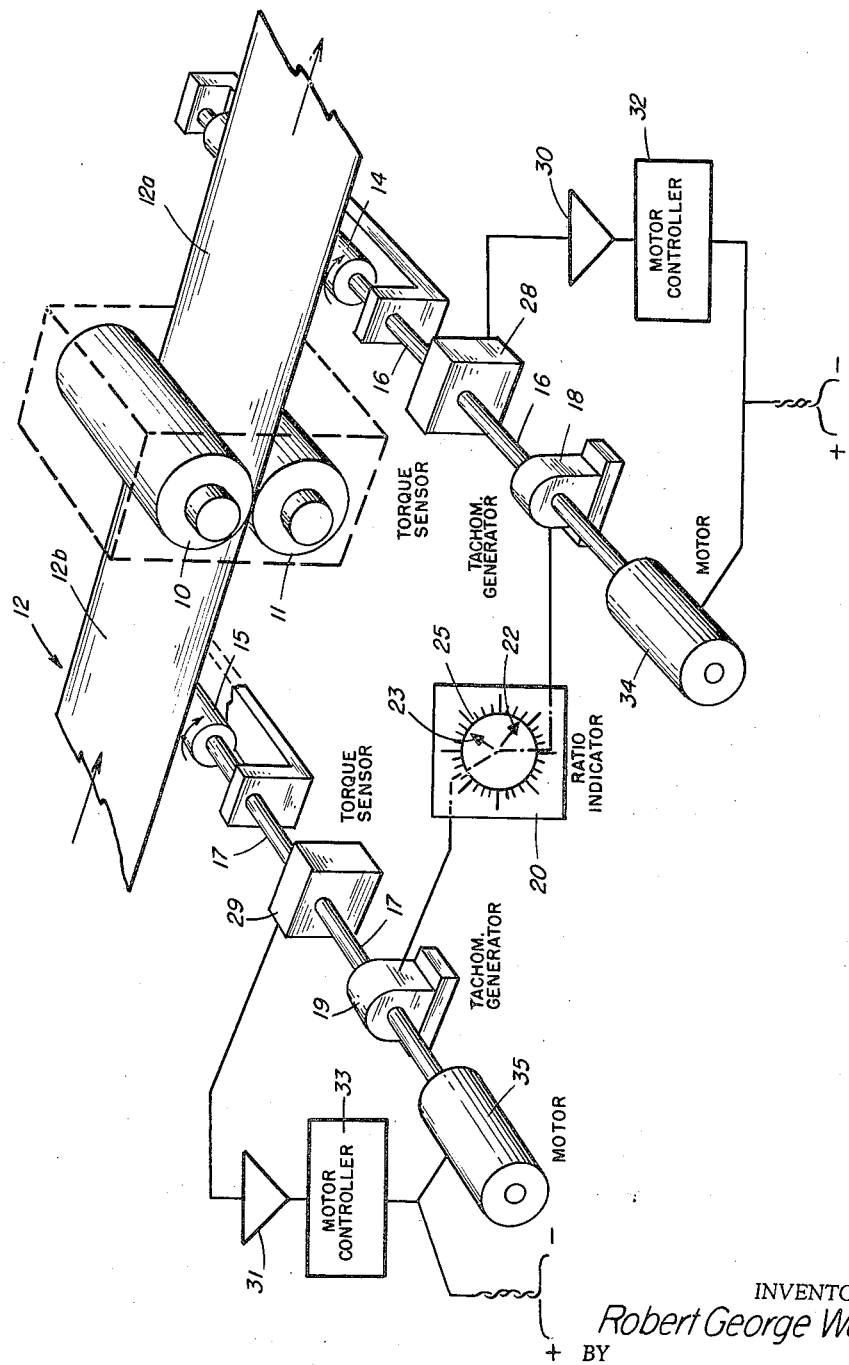
INVENTOR.
Robert George Watson
BY
Robert S. Dunham
Attorney

United States Patent Office 3,197,137
Patented July 27, 1965

3,197,137
APPARATUS FOR SENSING DISPLACEMENT OF OR DISTANCE ALONG A SURFACE
Robert G. Watson, South Euclid, Ohio, assignor to Republic Steel Corporation, Cleveland, Ohio, a corporation of New Jersey
Filed June 20, 1962, Ser. No. 203,794
20 Claims. (Cl. 235—103.5)

This invention relates to apparatus for measuring relative displacement between a surface and a given locality, for example in terms of speed, or length, or distance traveled, and in a particularly important sense is concerned with wheel-type measuring devices of the character stated, that function through frictional, rolling contact with the surface under measurement and that include a tachometer, counter, or other indicating or integrating device driven by the sensing wheel.

Common examples of such instrumentalities are constituted in devices for measuring distance along a sheet or other object, such as equipment for measuring the length of a traveling strip or web as it passes a given point, and also in arrangements for measuring the speed of travel of a continuously moving strip or other surface. Thus in an industry such as the manufacture of steel, these devices can be employed to determine the footage of product produced, such as strip, rod, tubing or the like, or may be employed for controlling the shearing of product to an exact length, i.e. as where the product is displaced past the measuring wheel until it has traversed a predetermined distance. Thickness or gauge measurements can also be achieved; for example, by bending a strip over a roll in the path of its travel and measuring the speeds respectively of the upper and lower surfaces at a region of contact with the roll, the strip thickness is determinable as a simple function of the difference of speeds, it being apparent that the speeds of such surfaces are proportional to their distances, radially, from the axis of the roll. Frictional-contact-controlled devices of the kind described are readily adaptable to the foregoing and many other types of speed or distance responses.

As will be explained below, one notably useful type of measuring instrument embracing means of this sort is designed for determining the elongation of steel strip as it passes through mill rolls or other equipment for reducing it by deformation, such determinations being derived by measurements of the speed of the passing strip, both before and after its traversal of the rolls, made with wheel-type devices bearing on the strip and registering through suitable tachometers.

In apparatus of this sort, a special problem resides in the occurrence of slippage between the bearing or measuring wheel (as coupled to a generator, counter or the like, driven thereby) and the surface upon which it rolls. To the extent that such slippage occurs, the readings of speed or distance are inaccurate, as likewise any determinations predicted upon them. The problem is heightened, of course, in that in most cases the slippage may vary, with changes of speed or otherwise, nor has it been apparent how there could be any satisfactory compensation or correction for the deficiencies of measurement. Heavy pressure or weight on the contact wheel may tend to reduce slippage, but undue wear on the wheel is apt to result, reducing its diameter and correspondingly impairing accuracy. Furthermore the greater the pressure on the rolling device, the greater is the tendency to produce disfiguring or other unwanted marks, even distortions or indentations, on the surface under measurement, a result highly undesirable in many operations such as the production of finished metal strip. Indeed in some cases or for some kinds of sheet materials or the like, heavy weight on the measuring wheel may unduly load the moving article, interfering with its proper alignment or speed of passage.

An important object of the present invention, therefore, is to overcome these difficulties and to afford improved, frictional-contact-controlled means for measuring relative surface displacement, wherein slippage is avoided, or reduced essentially to zero, thereby providing true or optimum synchronization between the surface of the wheel or equivalent device and the surface which it frictionally engages (considering such surfaces to be moving relative to the axis of the wheel) and which is the subject of measurement, e.g. as to distance or velocity of travel.

In other words, a chief aim of the invention is to provide effective, automatic means whereby a sensing wheel or the like is caused to produce a reading of lineal footage (or correspondingly, of speed) which is truly or far more closely equal to the actual footage of the passing surface. More generally, the objects of the invention are to improve the accuracy of sensing or measurement in devices of the class described, especially by reducing friction slip or its effect, and in such manner as to avoid the consequences heretofore attendant on the use of heavier pressure or the like; indeed a further aim of the present improvements is to permit the use of relatively light contact pressure while maintaining high accuracy of frictional tracking.

In its broader aspects, the invention is applicable to a variety of types and uses of frictional contact sensing means in measuring the length of moving strips or other surfaces, or their velocities, and indeed is applicable to any such measurements where there is relative displacement between the surface and the sensing wheel or like device. As will be understood, problems of the sort described can arise in operations where the surface under measurement is stationary and the wheel is moved along or around it, so that references herein to displacement of the surface relative to a locality (such as the mounting or axle of the wheel) are intended, unless otherwise specified to include situations of measuring a stationary surface as in the manner just mentioned.

In a particular sense, however, as indicated above, the present improvements are of special advantage in determining sheet or strip extension in metal rolling operations. Thus a specific description is set forth below, of instrumentalities for measuring elongation of steel strip in a cold rolling operation, representing essentially new and advantageous apparatus for achieving such determinations. The amount of extension of a steel strip while traversing the rolls of a mill is also a measure of the reduction in thickness, and likewise of the extent of working, occasioned by the pass, so that measurements of extension can find utility in determination or control of the gauge of the product, or quite importantly, for example, in determinations for assurance that the steel has received an amount of cold working appropriate for achievement of desired mechanical or physical properties.

To the foregoing and other ends, the invention embraces the combination, with a wheel or other device frictionally engageable with a surface to be measured in speed or length, of means for detecting torque or equivalent stress between the wheel and a tachometer, tachometer generator or other translating instrumentality which is coupled to the wheel and governed thereby, together with driving means for the translating or measuring instrumentalities and means responsive to the torque sensing element for controlling the driving means so as to maintain the detected torque or stress at zero or essentially zero value. By this arrangement, the sensing wheel or the like operates free of load in the translation of its frictionally-engaging movement into the desired measurement of relative displacement between the engaged surface and the locality of the transmitting shaft of the wheel. The system of wheel and tachometer (or like device) thus moves synchronously with the surface at all times, i.e. in practically exact synchronism between the wheel surface and the surface under measurement, there being now essentially no load to induce or magnify frictional slippage or its effects.

In conventional prior systems, for example where a sensing wheel on a moving surface is mechanically connected to drive a tachometer generator or the like for registering the speed of the surface, any significant difference in the wheel speed relative to the surface is commonly accompanied by torsion in the coupling shaft between the wheel and tachometer. Indeed, the existence of energy transfer between the wheel and the generator, for example because of work necessary to drive the latter, implies the presence of torque in the coupling shaft, and correspondingly tends to induce or increase slippage between the wheel and the surface. Since the power for the generator is derived (from the surface) through friction, slippage is variable, especially under conditions of changing speed. In such cases, the inertia of the wheel and generator opposes any change in the speed of the strip. If the generator is rotating at a lower rate than the speed of the strip, energy is conveyed from the strip to the generator or tachometer through the wheel and shaft. Conversely, if the generator is rotating above the strip speed, i.e. during a time when the strip is slowing down, the energy transfer in the system is reversed, passing then through the shaft toward the strip.

In all such cases the energy transfer creates torsion in the coupling shaft, with corresponding slippage between the wheel and strip in one direction or the other. As will now be seen, the apparatus of the present invention is designed to reduce this torsion, or torque, to zero, whereupon there is no energy transfer in either direction between the generator (or tachometer) and the strip, and in consequence the speeds of the strip and the sensing system are kept in agreement at all times.

Specifically, the invention embraces the provision of a torque sensing device in the coupling between the sensing wheel and the tachometer generator or other translating means, which is arranged to control a motor, i.e. a source of power, that is coupled in driving relation to the generator or rotating system, the control being exercised in such fashion as to reduce the torque in the coupling shaft to zero. Thus the tachometer or tachometer generator is driven by a supplemental motor, which has its speed controlled and held in synchronization with the strip speed, as determined by a condition of zero torque in the friction wheel shaft. The resulting combination may be characterized as a controlled power-assist system for the special situation of friction wheel instruments, and effectively replacing an uncontrollable variable, i.e. the energy transfer, in such instruments. Essentially exact synchronization is thereby obtained between the periphery of the sensing wheel and the surface of the strip or sheet under measurement, so that slippage is correspondingly eliminated and the reading of the instrument, as to speed, distance or the like, is brought to a high order of accuracy and reliability.

As the invention is of special significance in the determination of extension or elongation in rolling operations upon metal strip, an illustrative example of the apparatus is therefore set forth below in the form of an instrument for such purpose.

The accompanying drawing shows, diagrammatically, an arrangement of a rolling mill stand, with the system of the present invention as embodied in an extensometer, providing readings on a suitable ratio indicator, for determining relative speeds of the metal strip before and after the roll pass.

Referring to the drawing, the mill stand is indicated by the upper and lower work rolls 10, 11, through which a strip of steel 12 is continuously advanced, being elongated by the rolling operation, that may be assumed, for purposes of illustration, to be cold rolling. Thus the desired determination of elongation, and of the extent of working imparted in the strip, is to be achieved by comparing the speed of the departing strip at 12a with its speed of entering the rolls at 12b.

For this purpose, contact wheels 14, 15, being rolls or rollers of suitable configuration and material, are arranged to engage the surfaces of the strip, conveniently the under surfaces, at the regions 12a, 12b respectively. By coupling shafts 16, 17, the wheels 14, 15 are connected to corresponding tachometer generators 18, 19, which may be of known construction, providing an electrical output representative of the speed of rotation of their shafts, e.g. by frequency of delivered electrical pulses or by magnitude of voltage or current generated. The continuing signals from the devices 18, 19 are translated by appropriate indicating or recording means, as for example a conventional ratio indicator 20 which may have a pair of pointers 22, 23 respectively registering the speeds of the systems 14–18 and 15–19, against a single scale 25, whereby the ratio of readings may be taken to represent the desired measurement, such as the ratio of strip speeds or corresponding percentage elongation (or reduction) of the strip 12. Other types of ratio indicators or the like may be employed, whether embodying separate pointers or indicating scales or whether reading directly in ratio by the postioning of a single pointer or similar element. Indeed it will be understood that not only the rolling mill 10–11, but also the basic elements of the ratio indicating system 14, 15, 18, 19 and 20, may be of any appropriate, known construction.

In accordance with the present invention the coupling or transmitting shafts 16, 17 are respectively provided with torque sensing devices 28, 29. These instrumentalities, which include elements connected in the respective shafts 16, 17, may be of the nature of known types of devices for detecting torque or stress (or perhaps more usually, a strain which evidences such stress) in a rotating shaft or the like, e.g. arrangements as heretofore employed for making sensitive measurements of torque or energy transfer as employed in determining driving load, power transmission or similar values, the output of such device yielding an electrical signal proportional in magnitude to the amount of torque and exhibited in direction or phase corresponding to the direction in which torque is exerted lengthwise of the shaft under test.

The electrical outputs of the respective torque sensors 28, 29 are amplified by suitable electronic amplifiers 30, 31, and are impressed on appropriate motor control elements 32, 33 which in turn govern a pair of driving motors 34, 35 respectively coupled to the tachometer generators 18, 19 as by extensions of the shafts of the latter, the motors being energized, under separate control by the elements 32, 33, from a conventional current source, not shown.

Thus as to the system of the friction wheel 14 and tachometer generator 18, the latter device is now in effect powered by the motor 34, the generator 19 being similarly driven by the motor 35. The amount of energy impressed on each of the generators 18, 19 by their respective motors 34, 35 is governed by the corresponding torque sensors 28, 29 and motor control devices 32, 33, the latter elements being constituted by conventional components (in a manner which will be readily understood) for translating a control signal variable in magnitude and in direction, into adjustment of the motor 34 or 35, i.e. adjustment of its speed upward or downward until the desired null point is reached in the signal or other output of the sensing device 28 or 29, representative of a condition of zero torque in the coupling between the related friction wheel and its tachometer generator. In consequence the tachometer generators 18, 19 are in effect continuously driven by the motors 34, 35 at speeds respectively proportional to the speeds of the strip regions 12a and 12b, exactly as sensed by the wheels 14 and 15. In other words, the motors are controlled so that they continuously supply power, as for overcoming bearing friction, windage losses and the like in the driven parts at all times, but the amount of power to each motor, indeed in effect the speed of the motor, is adjusted (preferably in a very rapid manner) as necessary to maintain essentially zero torque in the system that consists of the contact wheel or its equivalent and the tachometer generator.

By way of description of operation, and referring to the system of the roller 14 and generator 18 as representative of both wheel-generator combinations, it will be seen that in a steady-state condition, the motor 34 delivers sufficient energy to drive the generator 18 with no load imposed on the wheel 14 and without excess energy as might tend to drive the wheel faster than the passing strip portion 12a, the speed of the shaft 16 being kept exactly equal to the intended speed of the wheel. The wheel itself turns simply as if it were idling, and thus follows the movement of the passing strip in substantially exact synchronism, and essentially without slippage. Hence there is effectively complete synchronism of the entire system, including the generator 18, with the strip region 12a under measurement.

If the strip increases in speed so that the wheel 14, moving faster, tends to transmit acceleration to the generator 18, the resulting torque in the shaft 16 is detected by the sensor 28, yielding a corresponding electrical signal that is amplified by the device 30 and impressed on the controller 32, which thereupon effectuates an increase in the suppy of electrical energy to the motor 34, for upward adjustment of the speed of the latter and of its load, the tachometer generator 18. Hence the generator 18 is caused to follow the increase in speed of the strip 12a, the control system being brought to balance (at the higher speed condition) with the torque at zero value in the shaft 16, and with the energy for drive of the generator fully supplied by the motor 34. There is thus no appreciable slippage of the wheel 14 by reason of the need to accelerate the generator, and no impairment of the accuracy of the signal from the latter to the ratio indicator 20 as measuring the strip speed at all times.

If, on the other hand, the speed of the strip at 12a starts to fall, with corresponding tendency of the system, by its inertia, to continue rotating at its previous, faster speed, and thus to drive the wheel faster than the strip, the sensor 28 detects torque exercised in the opposite direction, i.e. from the generator 18 to the wheel 14. The resulting signal, amplified by the electronic device 30, is translated by the controller 32 into an adjustment of the motor 34 to a correspondingly lower speed, i.e. with the power of the motor reduced and the motor delivering less energy to the rotating system. In consequence, the speed of the tachometer generator 18 falls essentially in accompaniment to the drop in speed of the strip 12a, allowing the wheel to slow down promptly with the strip and again reaching or maintaining a zero torque condition in the shaft 16. Thus the control operation resumes balance with the generator 18 driven in continued synchronism with the strip, there having been no significant slippage of the wheel 14 such as would otherwise have existed because of the inertia of the generator and the transient tendency of the latter to drive the wheel ahead of the strip.

Similar corrective operations occur whenever there is departure of the situation of the coupling shaft 16 from a condition of zero or essentially zero torque as detected by the sensor 28, i.e. as occasioned by speed changes in the strip portion 12a, or indeed for any other cause, all with the result that the tachometer generator 18 quite precisely registers the actual speed of the strip at 12a at all times. As will be understood, the system governed by wheel 15, i.e. including the torque sensor 29, controller 33, motor 35 and tachometer generator 19 driven by the latter, function in exactly the same way and likewise maintain accurate synchronism of the generator-wheel system with the strip portion 12b.

The readings of the ratio indicator 20 or other indicating or recording means for registering the outputs of the tachometer generators therefore afford a high accuracy of measurement of the relative speeds of the strip portions 12a and 12b or of the corresponding extension of the steel as occasioned by the cold rolling pass through the rolls 10, 11. Because of the reduced torque requirements, which approach zero as a limit, for the operations performed by the contact wheels 14, 15, these wheels or rolls may be smaller in size than heretofore deemed necessary in apparatus of this sort, and the pressure of contact between each wheel and the steel strip may be greatly reduced from usual values. With smaller or lighter wheels, there is less wheel inertia, it being remembered that the energy to overcome such inertia must still be supplied by the traveling surface. Reduction in wheel contact pressure correspondingly reduces the wear of the wheel at its bearing surface and also obviates or greatly lessens the possibility of defacement or other undesired impression on the surface of the traveling strip, by the wheel. All of these features of improvement serve to enhance the greater sensitivity and fidelity of response that characterize frictional-contact measuring devices of the essentially load-free nature here described. Thus, for example, as employed to measure the elongation achieved in rolling, the new sensing means affords such accuracy of response, indeed continuously so, as to constitute a new order of refinement in production control.

It will be appreciated that the torque sensors 28, 29 are illustrated in a purely diagrammatic manner, various types of devices fully suited to such purpose being well known, for example torque transducers operating on electromagnetic principles with respect to appropriate elements on the shaft that respond to the strain due to torque, i.e. resulting from a force moment in the system. Indeed it will be understood that the torque in the coupling system, in effect in the shaft, can be detected by means not directly associated with the shaft itself (or equivalent coupling), a presently preferred example being a so-called torque table type of transducer (of known construction), which would be used with the housing or stationary part of the tachometer generator, and in which measurement of differential strain in pillars or other members constituted to support such housing or part, will afford the desired torque determination. Hence devices of this last-described, reaction type are to be considered equivalents of devices immediately connected with the coupling shaft itself, and effectively constitute means for measuring torque in such shaft.

As indicated, measuring apparatus according to the invention, that includes torque or stress sensing means in the coupling between the frictional element and the translating device controlled thereby, together with the provision for auxiliary drive of the latter device in such fashion as to maintain the sensed torque or stress at essentially zero value, is applicable to a variety of circumstances or uses (in determining speed or lineal footage) other than strip speed or extension measurements in cold rolling operations. The improved measuring means are equally appropriate, for example, for surface speed determinations in hot rolling; indeed with problems of slippage eliminated, the different frictional conditions in hot rolling constitute no obstacle to success with devices of this type.

More generally expressed, the invention can be adapted to all mechanical forming, handling and measuring systems wherein dependence is placed on synchronous contact with the relatively moving material and where contact slippage is undesirable. Thus further instances of use are with lineal synchronizing systems in which the frictionally detected displacement is of a lineal nature and the corresponding transmission condition that promotes slippage is exhibited in lineal stress or deflection, such stress or deflection being then detected and used for control of an auxiliary power drive for the measuring instrumentality. Situations of this sort occur, for example, where in a processing line a material must be cut, punched or modified to accurate dimension and where a riding-type carriage for such task is sought to be synchonized by using grip type clamps, deflection in such clamps being then utilized, pursuant to the principles of the invention, to sense non-synchonization of speed or position and to control power drive of the carriage for maintaining zero deflection. In all cases, whether with wheel elements or otherwise, sensing of strain in the system and maintenance of powered actuation at a level to provide zero strain, affords very substantial advantage in respect to fidelity of synchonization, all such arrangements thus representing in effect, more accurate apparatus or devices for measuring the displacement of the material.

It is to be understood that the invention is not limited to the structures herein shown or described but may be embodied in other forms without departure from its spirit.

I claim:

1. In apparatus for measuring relative displacement between a surface and a predetermined locality, in combination, a wheel disposed at said locality for frictional engagement with the surface, a measuring system coupled to said wheel, including measuring means connected for movement in accompaniment to the wheel, adjustable driving means for the measuring means, and torque-sensing means associated with the measuring system and responsive to torque detected between the wheel and the system, for adjusting the driving means to vary the speed of the measuring means as needed to maintain a condition of essentially no torque in the coupling of the system to the wheel.

2. Apparatus as defined in claim 1 which is arranged to measure the speed of the surface as it travels past the predetermined locality, and in which the measuring means comprises a tachometer generator for delivering an electrical signal representing the speed of rotation of said generator, said measuring means having an indicating device governed by said electrical signal.

3. Apparatus as defined in claim 2 wherein the driving means is an electric motor and the torque-sensing means comprises a torque-detecting device connected with the system for delivering an electrical signal representing torque, an amplifier connected to receive said last-mentioned signal and having an output, and motor control means connected to the amplifier output for adjusting the motor in response to said last-mentioned signal.

4. In apparatus for measuring relative displacement between a surface and a predetermined locality, in combination, a device frictionally engageable with the surface for movement therewith, said device having coupling means connected with the device and means mounting the device at said locality for contact with the surface to move the coupling means in accordance with drive of the device by the surface relative to the mounting means, measuring means connected to the coupling means and responsive to movement thereof, said coupling means and measuring means constituting a measuring system, and means for inhibiting slippage between the device and the surface occasioned by energy transfer between the device and the measuring means, comprising means associated with the measuring system for detecting stress thereon occasioned by the aforesaid energy transfer, adjustable driving means connected to the measuring means for supplying driving energy thereto, and means controlled by the stress-detecting means for adjusting the driving means to maintain its energization of the measuring means at such values as to reduce said energy transfer to zero, so that the measuring means is operated substantially synchronously with the aforesaid relative displacement of the surface.

5. In apparatus for measuring relative displacement between a surface and a predetermined locality, in combination, a wheel frictionally engageable with the surface and having coupling means connected with the wheel and means mounting the wheel at said locality for contact with the surface to turn the coupling means in accordance with drive of the wheel by the surface, measuring means connected to the coupling means and responsive to rotation thereof, and means for inhibiting slippage between the wheel and the surface occasioned by energy transfer between the wheel and the measuring means, comprising means for detecting torque in the coupling means occasioned by the aforesaid energy transfer, adjustable driving means connected to the measuring means for supplying driving energy thereto, and means controlled by the torque-detecting means for adjusting the driving means to maintain its energization of the measuring means at such value as to reduce the torque in the coupling means to zero, so that the measuring means is operated substantially synchronously with the aforesaid relative displacement of the surface.

6. In apparatus for measuring displacement of a traveling surface, in combination, a wheel arranged for rotative frictional engagement with the surface and having coupling means connected with the wheel, measuring means connected to the coupling means for movement in accordance with rotation of the wheel, adjustable driving means for the measuring means, and torque-sensing means for detecting torque in the coupling means and having control means responsive to detected torque for adjusting the driving means to modify its driving energy to the measuring means in a direction to reduce said detected torque.

7. In apparatus for measuring displacement of a traveling surface, in combination, a wheel arranged for rotative frictional engagement with the surface and having coupling means connected with the wheel, measuring means connected to the coupling means for movement in accordance with rotation of the wheel, and means for inhibiting slippage between the wheel and the surface occasioned by energy transfer between the wheel and the measuring means, comprising means for detecting torque in the coupling means occasioned by the aforesaid energy transfer, adjustable driving means for the measuring means, and means controlled by the torque detecting means and responsive to occurrence of torque in said coupling means for adjusting the driving means to maintain movement of the measuring means with essentially no torque in the coupling means, so that the measuring means is operated substantially synchronously with the travel of the surface.

8. In apparatus for measuring speed of travel of a surface, in combination, a wheel arranged for rotative frictional engagement with the surface and having coupling means connected with the wheel, tachometer means connected to the coupling means for rotation in accompaniment to the wheel, said coupling means and tachometer means constituting a measuring system, adjustable driving means connected to the tachometer means for supplying driving energy to rotate said tachometer means, ad torque-detecting means associated with the measuring system and arranged to control the driving means in response to detection of torque in said coupling means, for adjusting the driving means to modify the driving energy to the tachometer means in a direction to reduce the torque detected in the coupling means.

9. In apparatus for measuring speed of travel of a surface, in combination, a wheel arranged for rotative frictional engagement with the surface and having coupling shaft means extending therefrom, tachometer means connected to the coupling shaft means for rotation in accompaniment to the wheel, torque-sensing means for detecting torque in the coupling shaft means with respect to the wheel, adjustable driving means connected to the tachometer means for supplying driving energy to rotate said tachometer means, and means controlled by the torque-sensing means for adjusting the driving means to maintain the driving energy to the tachometer means at a level to provide essentially zero torque in the coupling shaft means, for correspondingly inhibiting slippage of the wheel occasioned by energy transfer between the wheel and the tachometer means.

10. In apparatus for measuring displacement of a traveling web of material, a rotatable element in frictional engagement with said traveling web for sensing movement of the web, a tachometer generator, coupling means linking the rotatable element with the tachometer generator, a motor to drive the tachometer generator, torque-sensing means for producing an output in response to a torque created in the coupling means and produced by variations in the speed of the traveling web in relation to the speed of the tachometer generator, means responsive to the torque sensing means for controlling said tachometer motor in speed so as to minimize the torque in the coupling means, and indicating means responsive to the tachometer generator output for providing information as to the length of travel of said traveling web.

11. In a wheel-type device for measuring displacement of a traveling web of material, a wheel in frictional contact with and driven by the traveling web, a tachometer generator, a coupling shaft linking the wheel to the tachometer generator, a tachometer motor for driving the tachometer generator, a torque sensor for sensing torque in the shaft to determine the relation of the speed of the web to the speed of the tachometer generator and for producing an output responsive to this relation, and means responsive to the torque sensor output for controlling the aforesaid motor in speed to synchronize the tachometer generator motion with the web travel.

12. In a device for measuring displacement of a traveling strip, a sensing element in contact with and responsive to motion of the strip, a tachometer generator, a shaft for coupling the sensing element to the tachometer generator, a tachometer motor for driving the tachometer generator and means sensing torque in the coupling shaft and thereby responsive to relative motion of the strip and the tachometer generator for controlling the tachometer motor in a manner tending to synchronize the tachometer generator with the traveling strip.

13. In a device for measuring displacement of a traveling web, a control system for minimizing friction slip comprising a sensing element in frictional contact with the traveling strip, a tachometer generator coupled to the sensing element, a motor for driving the tachometer generator in synchronism with the traveling web, and motor-controlling means arranged under control of the sensing element and the generator and responsive to a condition of non-synchronism for adjusting the speed of the tachometer motor so as to establish synchronism.

14. In a device for measuring displacement of a traveling web as defined in claim 4 which includes coupling means between the element and the generator and wherein said motor-controlling means comprises an element associated with said coupling means for sensing the non-synchronous condition and for delivering an output reflecting this condition, means for amplifying said output, and means governed by said amplifying means for controlling the tachometer motor in speed, in response to said output.

15. A device for measuring the elongation of a traveling strip as it passes a set of mill rolls, comprising a first sensing element in frictional engagement with the strip prior to its passage through the mill rolls, a first tachometer generator, a first coupling means linking the first sensing element with the first tachometer generator, a first tachometer motor for driving the first tachometer generator, a first torque sensor for sensing torque in the first coupling means and for delivering a first output responsive to the sensed torsional condition, and a first means governed by the first torque sensor for controlling the first tachometer motor in speed in response to the said first output, to minimize torque in the first coupling means, a second sensing element in frictional engagement with the strip following its passage through the mill rolls, a second tachometer generator, a second coupling means linking the second sensing element with the second tachometer generator, a second tachometer motor for driving the second tachometer generator, a second torque sensor for sensing torque in the second coupling means and for delivering a second output responsive to the sensed torsional condition, a second means governed by the second torque sensor for controlling the second tachometer motor in speed in response to the said second output, to minimize torque in the second coupling means, and means connected to said first and second tachometer generators and responsive to their generated signals, for indicating the degree of elongation of the traveling strip.

16. In apparatus of the character described, in combination, a follower element engageable with a moving surface for movement therewith, a system coupled to the element for synchronism with the moving surface, including a measuring device connected for operation in accompaniment to the element, adjustable driving means for said device, and strain-sensing means associated with the aforesaid system and responsive to stress detected between the follower element and the system, for adjusting the driving means to vary the operation of said device as needed to maintain a condition of essentially no stress in the coupling of the system to the element.

17. In apparatus of the character described, in combination, a follower element engageable with a moving surface for movement therewith, coupling means connected with said element, a device to be operated in synchronism with the surface, connected to the coupling means for operation in accordance with movement of the follower element, adjustable driving means connected to the device for supply of driving energy thereto, means for detecting stress on the coupling means occasioned by energy transfer between the follower element and the device, and means controlled by the stress-detecting means for adjusting the driving means to maintain its energization of the device at such value as to reduce said energy transfer to zero, so that the device is operated substantially synchronously with the movement of the aforesaid surface.

18. Apparatus for measuring at least one ratio between the displacement of a first surface and the displacement of at least one other surface comprising separate follower elements engageable with each of said surfaces, a separate system coupled with each of said elements for synchronism with the associated moving surface, each said system including a measuring device connected for operation in accompaniment to the associated element, adjustable driving means for said device, strain sensing means responsive to a strain detected between the follower element and the system for adjusting the driving means to vary the operation of said device as needed to maintain a condition of essentially no stress in the coupling of the system to the element, and means connected to all of said measuring devices and operable in response to the signals thereof to derive displacement ratios therefrom.

19. Apparatus for measuring ratios between displacements of traveling surfaces comprising a displacement measuring system for each surface, each system comprising a wheel arranged for rotative frictional engagement with the surface and having coupling means connected with the wheel, measuring means connected to the coupling means for movement in accordance with rotation of the wheel, adjustable driving means for the measuring means, torque sensing means for detecting torque in the coupling means and having control means responsive to detected torque for adjusting the driving means to modify its driving energy to the measuring means in a direction to reduce said detected torque, and ratio indicating means connected to receive the measurements from said measuring means of the said systems and operable to indicate the ratio of said measurements.

20. Apparatus for measuring the reduction in a metal strip as it passes through a set of mill rolls in terms of the elongation of the strip comprising separate systems for measuring displacement of the strip as it enters and leaves the mill rolls, each of said systems comprising a wheel in frictional engagement with said strip, a torque sensing device, a tachometer generator connected to said wheel through said torque sensing device for rotation with said wheel, a motor connected to drive said tachometer generator, an amplifier connected for operation in response to the torque signal from said torque sensing device and connected to supply power to said motor in response thereto to thereby energize said motor to reduce the driving torque between said wheel and said tachometer generator, a voltage responsive ratio indicating device connected to receive the output signals from both of said tachometer generators to indicate the reduction in the metal strip in terms of the ratio of said tachometer voltages.

References Cited by the Examiner

UNITED STATES PATENTS

| | | | |
|---|---|---|---|
| 2,039,914 | 5/36 | McBane | 235—103.5 |
| 2,521,905 | 9/50 | Feller | 73—136 |
| 2,881,374 | 4/59 | Anger | 318—6 |
| 2,936,525 | 5/60 | Gollos | 33—134 |
| 3,029,022 | 4/62 | Horvath | 235—103.5 |

RICHARD C. QUEISSER, *Primary Examiner.*

ROBERT L. EVANS, *Examiner.*